Feb. 28, 1961 E. O. GABLE 2,973,109
APPARATUS FOR STACKING APERTURED PLATES
Filed Oct. 7, 1949
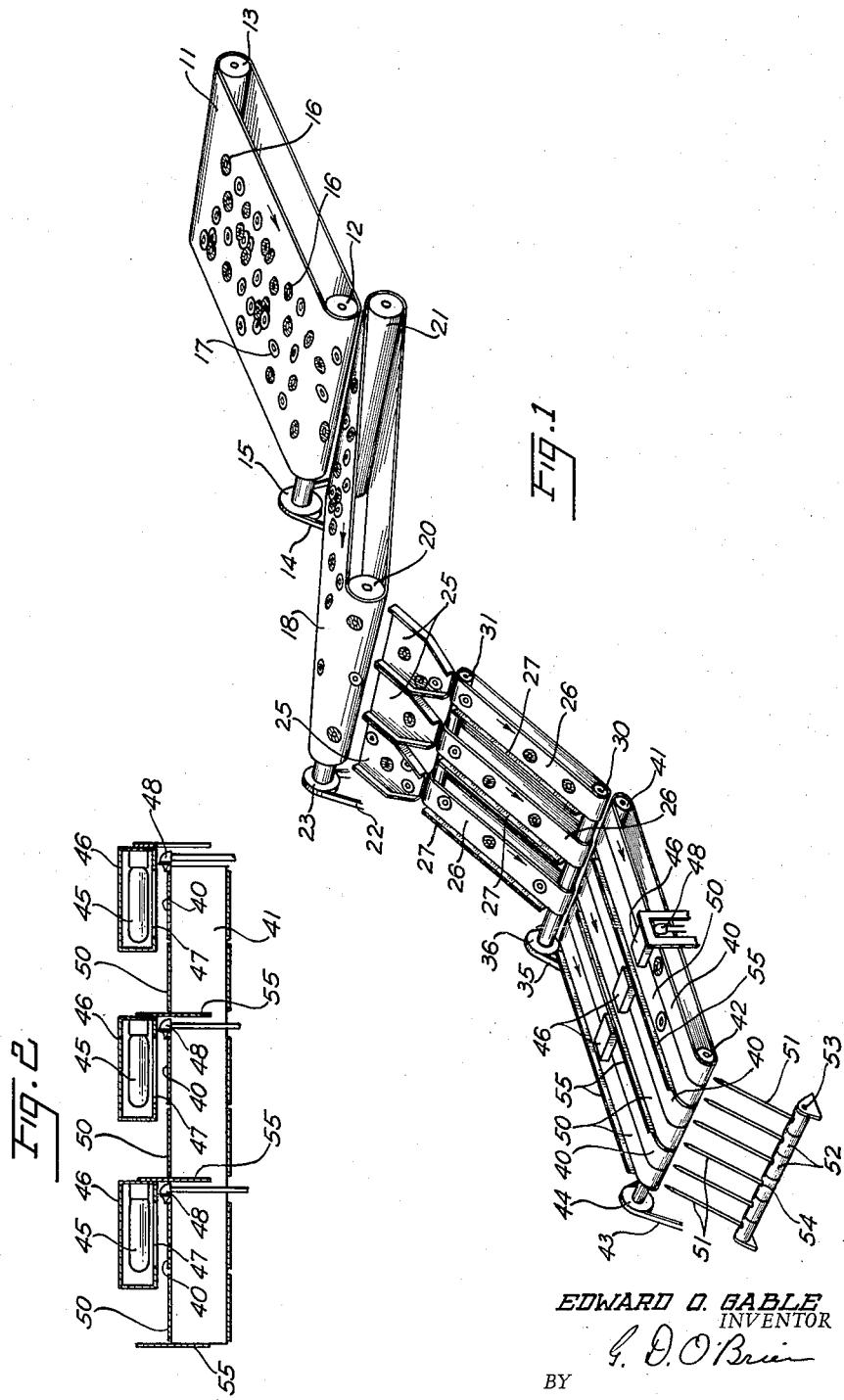
EDWARD O. GABLE
INVENTOR
BY
ATTORNEYS

United States Patent Office 2,973,109
Patented Feb. 28, 1961

2,973,109

APPARATUS FOR STACKING APERTURED PLATES

Edward O. Gable, Rochester, N.Y., assignor, by mesne assignments, to the United States of America as represented by the Secretary of the Navy Filed Oct. 7, 1949, Ser. No. 120,055

3 Claims. (Cl. 214—8)

This invention relates to apparatus for stacking a number of apertured plates with a desired side up.

It is frequently desirable in the manufacture of batteries, rectifiers and other units made up of an orderly pile of oriented plates that the heterogeneous aggregation of plates which comes from the blanking press be automatically stacked with a desired side up before being fed into apparatus for final assembly into the unit. Manual sorting of such plates is difficult, time consuming and often wasteful of material, and manufacture can usually be speeded up considerably if the plates are sorted and stacked automatically.

In the manufacture of deferred action type batteries, the plates are fabricated from thin metal with a coating of electronegative electrode material on one surface and a coating of electropositive material on the opposite side. The blanked battery plates feed from a punch press in heterogeneous arrangement with some of the plates having the electropositive coating at the upper surface and others having the electronegative side up, and for efficient assembly into a final battery unit the plates should all be automatically stacked with a desired electrode coating on the upper surface.

It is an object of the invention to provide apparatus for automatically stacking a number of heterogeneously arranged apertured plates with a desired side up.

In accomplishing thet objects of the invention, apertured plates having opposite sides of relatively high and low reflectance are dumped onto the first of a series of varying speed endless belts sloped at such angles and having such coefficients of friction that the plates are gradually separated until on the final group of belts the plates are individually carried along with considerable spacing between plates. Photoelectric means responsive to differences in reflectance of the electrode coatings on opposite sides of the plates ejects those plates having one of the two reflectances at the upper surface onto adjacent belts, and the apertured plates are then caught with the desired side up on inclined rods as they fall from the final group of belts.

Other objects and advantages of the invention will be apparent from the following detailed description when read in connection with the accompanying drawings in which:

Fig. 1 is a view in perspective of apparatus embodying the invention; and

Fig. 2 is a vertical sectional view taken on line 2—2 of Fig. 1.

In the preferred embodiment of the invention shown in the drawings, thin annular battery plates are dumped from trays onto a slowly moving, horizontal endless belt 11 mounted upon parallel horizontal shafts 12 and 13. By "horizontal endless belt", as used in the specification and in the appended claims, is meant any such broad, flexible leather, rubber or fabric band having the ends thereof joined passing around a drive shaft and an idler shaft which are spaced apart in the same horizontal plane. The shaft 12 is conveniently driven from an electric motor (not shown) by means of a belt 14 which transmits power to a pulley 15 secured to one end of the shaft 12. The battery plates are blanked from thin metal sheets coated on one side with an electronegative metal, e.g., zinc, and on the opposite side with an electropositive electrode material, e.g., carbon, or a single layer of electrode material is coated on a plate of the opposite electrode material, e.g., a coating of carbon on a sheet of zinc. The electropositive (carbon) side 16 has a black appearance, while the opposite electronegative side 17 is shiny. The battery plates are carried along the belt 11 until they fall off in bunches at the end near the shaft 12 onto an endless belt 18 which is mounted upon two parallel horizontal shafts 20 and 21. The shaft 20 is conveniently driven from an electric motor (not shown) by means of a belt 22 which transmits power to a pulley 23 secured to one end of the shaft 20. The driving shaft 20 is raised above the height of the shaft 21 so the belt 18 moves upward at an angle of approximately thirty degrees to the horizontal and at a speed approximately three times that of the belt 11. The belt 18 is preferably constructed of rubber or other material presenting a rough surface for gripping the plates and having a high coefficient of friction with the plates relative to the coefficient of friction between individual plates to allow separation of individual plates from the clusters assumed by the plates on the belt 11. As the plates fall from the belt 11, the forward edge of the plates strikes the belt 18 first, and the lower of the plates are gripped by and immediately pulled along the belt 18, causing the upper plates to slide back over the lower plates. If plates move along the belt 18 in clusters, the friction between individual plates is not sufficient to prevent the upper plates of the clusters from sliding backwards, while the bottom plates of the clusters are pulled upward along the belt 18 until the individual plates are separated one from the other.

As the plates reach the end of the continuous belt 18 near the shaft 20, they drop into one of three chutes 25 disposed adjacent the shaft 20. The wider end of each chute 25 covers approximately one third the width of the belt 18 so the plates are distributed approximately in equal thirds into the chutes 25. The chutes 25 narrow at the lower end to feed the plates onto three inclined narrow endless belts 26 having a high coefficient of friction with the plates relative to the coefficient of friction between individual plates and moving downward at approximately four or five times the speed of the belt 18. Vertical guides 27 parallel to the belts 26 along each side thereof prevent the plates from falling off the belts 26, but to avoid confusion of the drawing, vertical guides 27 are shown on only one side of the narrow belts 26 in the perspective view of Fig. 1. The three belts 26 are mounted upon a single pair of horizontal parallel shafts 30 and 31 with the shaft 30 displaced downward from the shaft 31 so that the belts 26 move downward at an angle of approximately 30° to the horizontal and at a speed of approximately seven inches per second. Power is transmitted to the shaft 30 to drive the three belts 26 by means of a belt 35 which conveniently delivers power from an electric motor (not shown) to a pulley 36 secured to one end of the shaft 30. If a plurality of plates fall simultaneously on one of the belts 26, the slope of the belts 26 causes the top plates to slide over each other in a direction down the belt, while the bottom plates 26 cannot slide down the belt 26 because of the relatively high coefficient fo friction between the plates and the belts 26. Thus, when the plates reach the end of the belts 26, they are separated one from the other by considerable distance, averaging three to four inches apart.

The plates fall from the three belts 26 onto three endless belts 40 of a group of six horizontal parallel belts all of which are mounted on a single pair of shafts 41 and 42. The three parallel belts 40 are in alignment with and travel at approximately three times the speed of the narrow inclined belts 26. The shaft 42 is conveniently driven from an electric motor (not shown) by means of a belt 43 which transmits power to a pulley 44 secured at one end of the shaft 42.

The plates are well separated one from the other as they move along the belts 40 with some of plates having the electro-positive black appearing side 16 at the upper surface and others having the electronegative shiny side 17 disposed at the top thereof. As the plates move along the belts 40, they pass beneath photoelectric cells 45 mounted within flat rectangular guards 46 directly above the belts 40. The photoelectric cells 45 are connected in well known electrical circuits to relays (now shown) which control pneumatic air ejectors 48 mounted at the side of the belts 40. Lamps (not shown) are provided to illuminate the plates, and when a plate with the shiny zinc side 17 up travels beneath a photoelectric cell 45, light is reflected through a slit 47 in the lower surface of the guard 46, and the photoelectric cell 45 passes sufficient current to operate the relay, which in turn actuates an air ejector 48. The ejector 48 emits a fine jet of air which blows those plates with the shiny side 17 at the top thereof onto an adjacent parallel horizontal endless belt 50. The flat rectangular guards 46 disposed above the air ejectors 48 prevent the plates from turning over as they are blown to the adjacent belts 50, and vertical guide rails 55 mounted along the side of the belts 50 away from the air ejectors 48 prevent travel of the plates past the belt 50 onto a belt 40. The air jet passes between the belt 40 and the flat guard 46 to blow the plates having the shiny side 17 up onto the belts 50.

The plates travel along the belts 40 and 50 at relatively high velocities, and as the plates near the shaft 42 they are traveling at a sufficiently high rate of speed that they tend to turn over as they fall from the belts. Six parallel, individually removable stack rods 51 extending upwardly at an angle to the horizontal are carefully adjusted to catch the plates as they flop over. Since the plates do turn over before they are caught on the stack rods 51, the plates caught on the rods 51 corresponding to the belts 40 will have the electronegative shiny side 17 on the upper surface thereof, while those plates caught on the rods 51 corresponding to the belts 50 will have the electropositive, black appearing side 16 on the upper surface thereof. The stack rods 51 are mounted in rollers 52 which are pivoted and can be individually positioned on a shaft 53 by means of set screws (not shown) to allow accurate setting of the position of each stack rod 51. Radial pins (not shown) mounted in the outer periphery of the stack rods 51 near the lower end thereof fit within bayonet slots 54 formed in the rollers 52 to allow quick removal and accurate resetting at the positions of the individual stack rods 51. As soon as a stack rod 51 is filled, it is manually replaced by an empty rod 51 and carried to apparatus for automatically feeding the plates into the final battery unit.

In operation trays of the apertured plates are dumped on the first horizontal belt 11. The plates resting against the belts 18 and 26 are carried along because of the relatively high coefficient of friction between the belts and the plates, while the top plates of a cluster slide backward in traveling up the belt 18 and downward over other plates in traveling down the belts 26 until the individual plates are separated by considerable distance. Each successive belt (or group of belts) of the series travels faster than the preceding belt so that the plates are well spaced one from the other on the final group of horizontal belts 40 to allow the photoelectric cells 45 to operate differently on successive plates as they travel beneath the guards 46. The conveyor system embodying the invention works at such speed that in operation it is possible to stack properly over 50,000 plates per hour.

Incidentally, the system of belts gives a tumbling action to remove loose burrs and particles from the plates.

While the embodiment of the present invention as herein described constitute a preferred form, it is to be understood that other forms might be adopted all coming within the scope of the claims which follow.

I claim:

1. Apparatus for stacking, with the same side up, apertured plates having opposite sides of relatively high and low reflectance, comprising an approximately horizontal, continuously moving endless belt for receiving said plates in a heterogeneous pile, an inclined endless belt having a high coefficient of friction with said plates relative to the coefficient of friction between the plates moving continuously upward at a faster speed than said horizontal belt and disposed to receive the plates as they fall from the horizontal belt to space them farther apart than they were on the horizontal belt and to carry them upward, the tangent of the angle of inclination of said inclined belt with the horizontal being greater than the coefficient of friction between plates but less than the coefficient of friction between a plate and said inclined belt, a second approximately horizontal endless belt moving continuously at a faster speed than said inclined belt adapted to receive the plates as they fall from the inclined belt, a third approximately horizontal endless belt adjacent and parallel to the second belt, means including a photoelectric cell for ejecting only plates having one of the two reflectance at the upper surface thereof from the second onto the third belt, means for catching said plates in orderly piles as they fall from said second and third belts, and means for driving said belts.

2. Apparatus for stacking, with the same side up, apertured plates having opposite sides of relatively high and low reflectance, comprising a wide, approximately horizontal, continuously moving endless belt for receiving said plates in a heterogeneous pile, a wide inclined endless belt having a high coefficient of friction with said plates relative to the coefficient of friction between the plates moving continuously upward at a faster speed than said horizontal belt and disposed to receive said plates as they fall from the horizontal belt to separate them farther than on said horizontal belt and to carry them upward, a number of narrow inclined endless belts also having a high coefficient of friction with said plates relative to the coefficient of friction between the plates moving continuously downward at a faster speed than said wide inclined belt and disposed to receive the plates from the wide inclined belt, the tangents of the angles of inclination of said wide and said narrow inclined belts with the horizontal being greater than the coefficient of friction between plates but less than the coefficient of friction between a plate and said inclined belts, a first group of narrow, approximately horizontal, endless belts disposed to receive the plates as they fall from the narrow inclined belts moving continuously at a higher speed than said narrow inclined belts, a second group of narrow, approximately horizontal, endless belts adjacent and parallel to the first group of belts, means including photoelectric cells for ejecting only plates having one of the two reflectances at the upper surface thereof onto belts of the second group, means for catching said plates in orderly piles as they fall from the narrow horizontal belts, and means for driving said belts.

3. Apparatus for stacking, with the same side up, apertured plates having opposite sides of relatively high and low reflectance, comprising a wide, approximately horizontal, continuously moving endless belt for receiving said plates in a heterogeneous pile, a wide inclined belt having a high coefficient of friction with said plates relative to the coefficient of friction between the plates moving continuously upward at approximately three times the speed of the horizontal belt and disposed to receive the plates as they fall from the horizontal belt, a number of narrow inclined belts also having high coefficient of friction with said plates relative to the coefficient of friction between the plates moving continuously downward at approximately four times the speed of said wide inclined belt, means for receiving the plates as they fall from the wide inclined belt and feeding the plates onto the narrow inclined belts, said wide and said narrow inclined belts having angles of inclination with the horizontal whose tangents are greater than the coefficient of friction between plates but less than the coefficient of friction between a plate and said inclined belts, a first group of narrow, approximately horizontal, endless belts disposed to receive the plates as they fall from the narrow inclined belts moving at approximately twice the speed of said narrow inclined belts, a second group of narrow, approximately horizontal, endless belts parallel to, adjacent to, and moving in unison with the belts of the first group, means including photoelectric cells for ejecting only plates having one of the two reflectances at the upper surface thereof onto belts of the second group, a number of inclined rods equal in number to the narrow horizontal belts disposed to catch the apertured plates as they fall from the narrow horizontal belts, and means for driving said belts.

References Cited in the file of this patent
UNITED STATES PATENTS

| | | |
|---|---|---|
| 1,077,162 | Rodakowski | Oct. 28, 1913 |
| 1,597,465 | Hepperle | Aug. 24, 1926 |
| 2,063,485 | Carris | Dec. 8, 1936 |